(12) United States Patent
Contractor et al.

(10) Patent No.: US 11,676,596 B2
(45) Date of Patent: Jun. 13, 2023

(54) DIALOG SHORTCUTS FOR INTERACTIVE AGENTS

(71) Applicant: International Business Machines Corporation, Armonk, NY (US)

(72) Inventors: Danish Contractor, Gurgaon (IN); Sachindra Joshi, Gurgaon (IN)

(73) Assignee: International Business Machines Corporation, Armonk, NY (US)

(*) Notice: Subject to any disclaimer, the term of this patent is extended or adjusted under 35 U.S.C. 154(b) by 219 days.

(21) Appl. No.: 17/189,575

(22) Filed: Mar. 2, 2021

(65) Prior Publication Data
US 2022/0284890 A1 Sep. 8, 2022

(51) Int. Cl.
*G10L 15/22* (2006.01)
*G10L 15/08* (2006.01)
*G06F 21/32* (2013.01)

(52) U.S. Cl.
CPC .............. *G10L 15/22* (2013.01); *G10L 15/08* (2013.01); *G06F 21/32* (2013.01); *G10L 2015/223* (2013.01)

(58) Field of Classification Search
CPC ... G10L 15/22; G10L 15/08; G10L 2015/223; G06F 21/32
See application file for complete search history.

(56) References Cited

U.S. PATENT DOCUMENTS

| | | | |
|---|---|---|---|
| 6,513,009 B1* | 1/2003 | Comerford | G10L 15/22 704/E15.04 |
| 2002/0128837 A1* | 9/2002 | Morin | G10L 15/22 704/E15.04 |
| 2008/0033994 A1* | 2/2008 | Sharma | H04M 3/4938 |
| 2009/0228944 A1 | 9/2009 | Bodlaender | |
| 2018/0197104 A1 | 7/2018 | Marin | |
| 2018/0278740 A1* | 9/2018 | Choi | G06F 3/04847 |
| 2019/0362252 A1 | 11/2019 | Miller | |
| 2020/0125632 A1 | 4/2020 | Ning | |

OTHER PUBLICATIONS

Disclosed Anonymously et al. "Method and System for a Person Based Marker Display in an Instant Messaging System", ip.com Prior Art Database Technical Disclosure, IPCOM000192687D, Jan. 28, 2010, pp. 1-8.

* cited by examiner

*Primary Examiner* — Abul K Azad
(74) *Attorney, Agent, or Firm* — Edward J. Wixted, III

(57) ABSTRACT

In an approach to creation and execution of dialog shortcuts, responsive to detecting initiation of a dialog, an utterance is received from a user. Whether the utterance contains an objective of the user is determined, where the objective is chosen from a group including create a shortcut, execute the shortcut, modify the shortcut, and delete the shortcut. Responsive to determining that the utterance contains the objective, the objective is implemented.

17 Claims, 5 Drawing Sheets

DIALOG SHORTCUTS FOR INTERACTIVE AGENTS

BACKGROUND

The present invention relates generally to the field of natural language analysis, and more particularly to creation and execution of dialog shortcuts.

Artificial intelligence (AI) can be defined as the theory and development of computer systems able to perform tasks that normally require human intelligence, such as speech recognition, visual perception, decision-making, and translation between languages. The term AI is often used to describe systems that mimic cognitive functions of the human mind, such as learning and problem solving.

Natural language processing (NLP) is a branch of artificial intelligence that helps computers understand, interpret, and manipulate human language. NLP is broadly defined as the automatic manipulation of natural language, like speech and text, by software. NLP draws from many disciplines, including computer science and computational linguistics, in its pursuit to give machines the ability to read, understand and derive meaning from human languages.

Machine learning (ML) is an application of AI that creates systems that have the ability to automatically learn and improve from experience. Machine learning involves the development of computer programs that can access data and learn based on that data. Machine learning algorithms typically build mathematical models based on sample, or training, data in order to make predictions or decisions without being explicitly programmed to do so. Machine learning algorithms are used in a wide variety of applications, such as image analysis, speech recognition, classification, and medical applications.

SUMMARY

Embodiments of the present invention disclose a method, a computer program product, and a system for creation and execution of dialog shortcuts. In one embodiment, responsive to detecting initiation of a dialog, an utterance is received from a user. Whether the utterance contains an objective of the user is determined, where the objective is chosen from a group including create a shortcut, execute the shortcut, modify the shortcut, and delete the shortcut. Responsive to determining that the utterance contains the objective, the objective is implemented.

DETAILED DESCRIPTION

Most real-world interactive agents, such as chatbots, are developed using dialog modeling frameworks that use intents, entities and dialog flows (or similar constructs) to build dialog models. An intent is the user's intention. For example, if a user types "show me yesterday's financial news", the user's intent is to retrieve a list of financial headlines. An entity modifies an intent. For example, if a user types "show me yesterday's financial news", the entities are "yesterday" and "financial". An utterance is anything the user says. For example, if a user types "show me yesterday's financial news", the entire sentence is the utterance. Given a user utterance, the dialog bot engine extracts entity mentions and identifies the most appropriate intent to invoke and returns a response from the dialog bot. Dialog flows encode how a conversation proceeds at each turn based on the intents; the dialog engine thus drives the dialog interaction with the user.

Repeated interactions with dialog systems can require tedious re-writes of queries/data already shared. Leaving aside conversation turns for authentication, users often may use dialogs or chats for processes they have executed previously, e.g., checking an account balance, topping off a mobile prepaid plan, transferring money for a regular payment, and so on. Non-chatbot based automated self-help systems such as automated teller machines often allow the user to define "favorite" transactions that help speed-up those transactions by reusing values from frequent transactions. The present invention is a method, computer program product, and system that allow users to define dialog shortcuts (in conversation) that execute similar repeated flows using information or dialogs executed previously.

Figure 2:
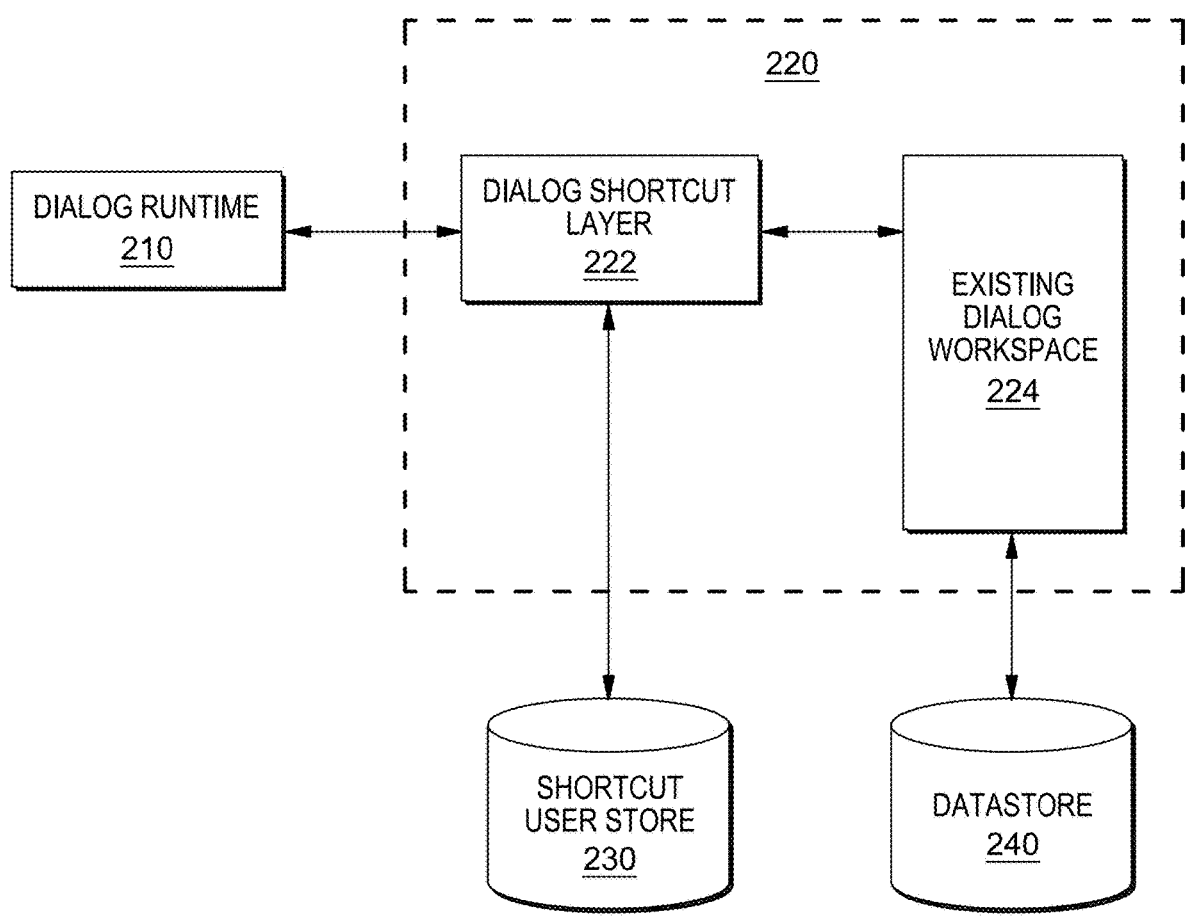
FIG. 2 is an example of one possible architecture of a dialog workspace incorporating the dialog shortcut layer, in accordance with an embodiment of the present invention.

The dialog shortcut layer sits between existing dialog workspaces and the dialog runtime. Any utterance is first sent to the shortcut layer to determine if the utterance contains an objective that the user wants to create a new shortcut, modify an existing shortcut, execute a shortcut, delete an existing shortcut, or an unknown operation. In an embodiment, invocation of a shortcut causes a background execution of a dialog with the back end dialog workspace, thus requiring no modifications to existing back end dialog architectures. An example of the operation of the dialog shortcut is shown in FIG. 2 below.

Enterprises often monitor dialog hot paths, i.e., dialogs that are frequently executed dialog flows in their dialog workspace. In some embodiments, these dialog flows could also be presented as recommendations by the present invention for new shortcuts where the user interaction layer permits. In other embodiments, these dialog hot paths could serve as recommendations to the business consultants when they are in the process of defining the dialog workspace for the shortcut layer.

Figure 1:
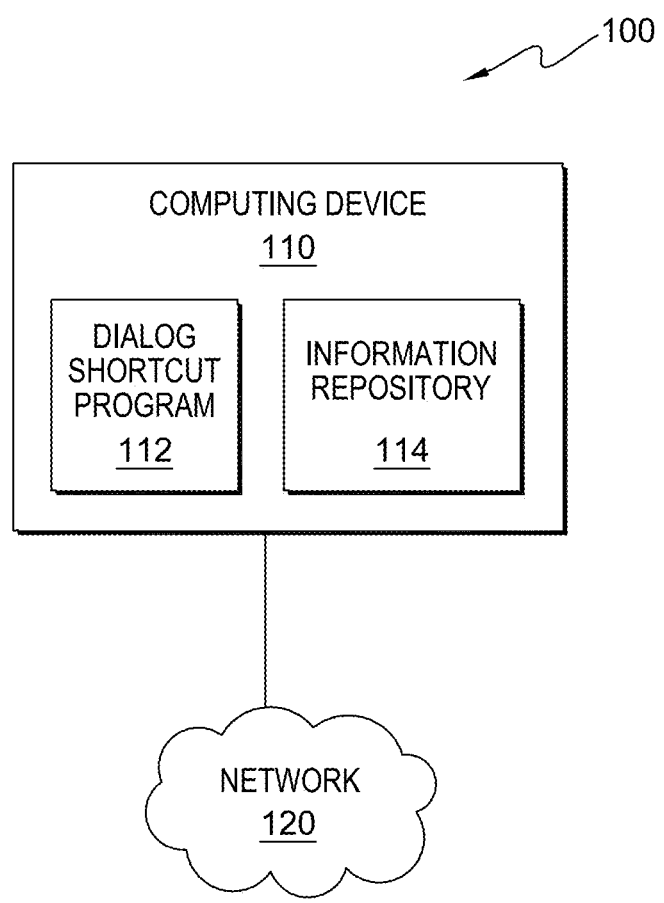
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of dialog shortcut program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes dialog shortcut program 112. In an embodiment, dialog shortcut program 112 is a program, application, or subprogram of a larger program for creation and execution of dialog shortcuts. In an alternative embodiment, dialog shortcut program 112 may be located on any other device accessible by computing device 110 via network 120.

In an embodiment, computing device 110 includes information repository 114. In an embodiment, information repository 114 may be managed by dialog shortcut program 112. In an alternate embodiment, information repository 114 may be managed by the operating system of computing device 110, alone, or together with, dialog shortcut program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, AI data, dialog input/output data, dialog shortcut data, dialog workspace data, data for the NLP tasks, user data, system configuration data, and other data that is received by dialog shortcut program 112 from one or more sources, and data that is created by dialog shortcut program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

FIG. 2 is an example of one possible architecture of a dialog workspace incorporating the dialog shortcut layer, in accordance with an embodiment of the present invention. This example illustrates how the dialog shortcut layer resides between the user dialog and the existing dialog workspace. FIG. 2 includes dialog workspace 220, which is an example dialog workspace that includes dialog shortcut layer 222. The input to dialog workspace 220 is dialog runtime 210, the dialog initiated with the user. In this example, this dialog is a chat session, but in various embodiments it can be any form of dialog that involves a dialog workspace, including a cloud-based dialog.

In this example, dialog shortcut layer 222 is dialog shortcut program 112. In an embodiment, dialog shortcut layer 222 can be implemented using the same dialog framework as the existing dialog workspace or could use any other alternative mechanism for supporting the shortcut dialog.

In an embodiment, the data associated with shortcuts for a user may be stored locally on the client side (with the user) as opposed to the central server. This is because the data associated with shortcuts for a user may contain Sensitive Personal Information (SPI) and if the central servers are compromised, user SPI could be compromised as well. In an embodiment, by storing the data associated with shortcuts for a user locally with the shortcuts, any unauthorized access to the central servers will not compromise the SPI of the user.

In an embodiment, dialog shortcut layer 222 connects to shortcut user store 230, which is a storage container for dialog shortcut layer 222. In an embodiment, shortcut user store 230 is part of information repository 114 from FIG. 1. In another embodiment, as mentioned above, shortcut user store 230 may be stored locally to the user to secure any user SPI.

In an embodiment, dialog workspace 220 includes existing dialog workspace 224, which is the original dialog workspace as would be found without the present invention. In an embodiment, dialog workspace 224 connects to datastore 240, which is a storage container for existing dialog workspace 224. In an embodiment, datastore 240 is part of information repository 114 from FIG. 1.

Figure 3:
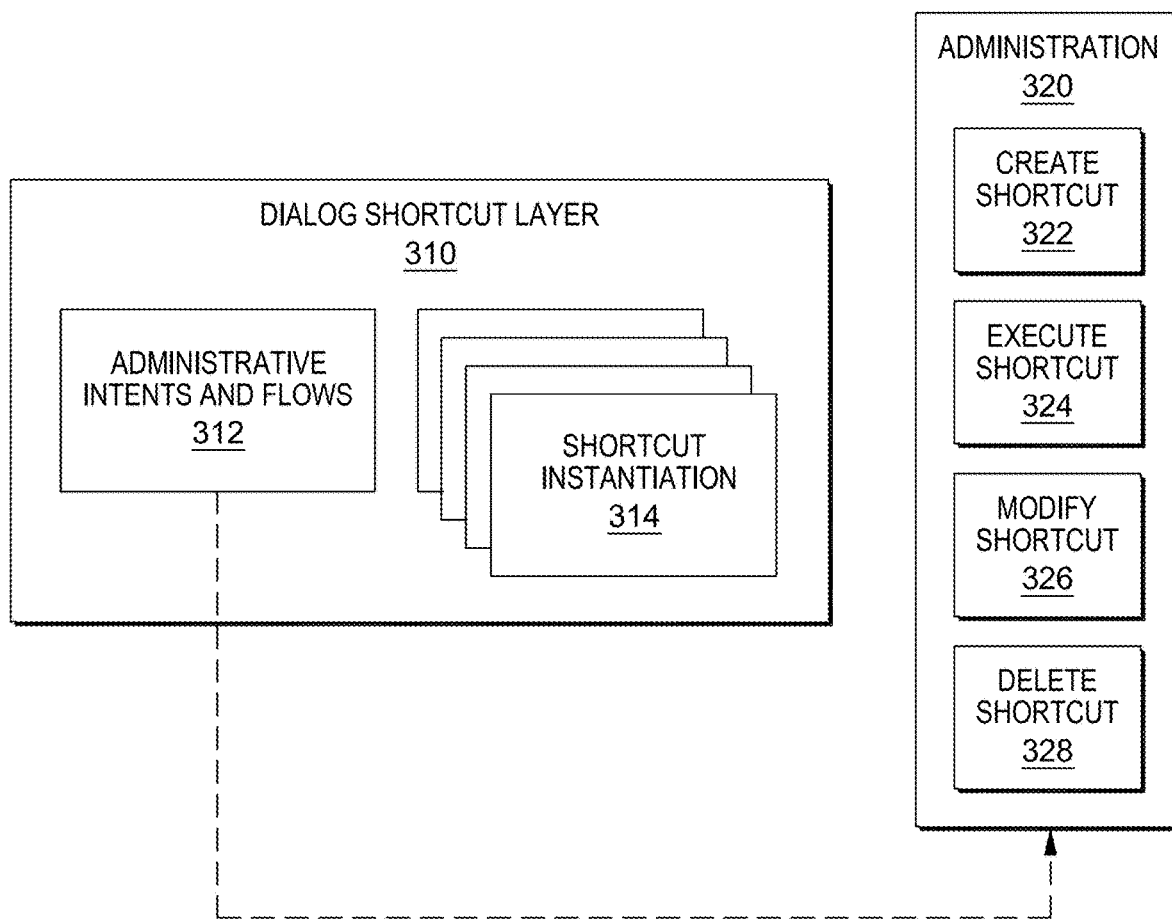
FIG. 3 is an example of the dialog shortcut layer, in accordance with an embodiment of the present invention.

FIG. 3 is an example of the dialog shortcut layer, e.g., dialog shortcut layer 222 from FIG. 2, in accordance with an embodiment of the present invention. The example of FIG. 3 includes dialog shortcut layer 310, which is a detailed view of dialog shortcut layer 222 from FIG. 2. Dialog shortcut layer 310 includes administrative intents and flows 312 and shortcut instantiation 314. Administrative intents and flows 312 is the section of dialog shortcut program 112 that performs administration of the dialog shortcuts. In this example, administration includes, but is not limited to, the functions of creation of a shortcut, modification of a shortcut, deletion of a shortcut, and execution of a shortcut. Shortcut instantiation 314 represent the instantiations of dialog shortcut program 112 for each dialog that is ongoing. In this example, four instances of shortcut instantiation 314 are illustrated, but it should be understood that many more instances may be instantiated in operation. It should also be understood that each instance of shortcut instantiation 314 is a separate dialog, that may or may not be related to any other instance of shortcut instantiation 314.

The example of FIG. 3 also includes administration 320, a detailed view of administrative intents and flows 312. This illustrates various functions that may be carried out by dialog shortcut layer 310, including, but not limited to, creation of a shortcut, modification of a shortcut, deletion of a shortcut, and execution of a shortcut. In the operation of create shortcut 322, dialog shortcut program 112 creates a new shortcut. In the operation of execute shortcut 324, dialog shortcut program 112 executes a shortcut. In the operation of modify shortcut 326, dialog shortcut program 112 modifies an existing shortcut. And in the operation of delete shortcut 328, dialog shortcut program 112 deletes an existing shortcut from the shortcut user store, e.g., shortcut user store 230 from FIG. 2.

In one example using dialog shortcut layer 310 as illustrated in FIG. 3, the shortcut instantiation may be a transfer of funds from a checking account. In this example, dialog shortcut program 112 creates mirror dialog flow instance for an existing dialog flow that the dialog bot uses for interaction. If there is a dialog flow for funds transfer that takes entity values of from, to, amount, then when the shortcut is created, dialog shortcut program 112 will create a dialog flow for the user chat as recorded and assign entity values from this recorded chat. Entity values may be confirmed by the dialog bot when the shortcut is executed. While the dialog flows typically model agents, in this case they can model the user based on the dialog used while creating the shortcut. This can be done by mirroring the agent flow. An execution of the shortcut is an execution of this mirrored flow along with the agent flow as before.

Figure 4:
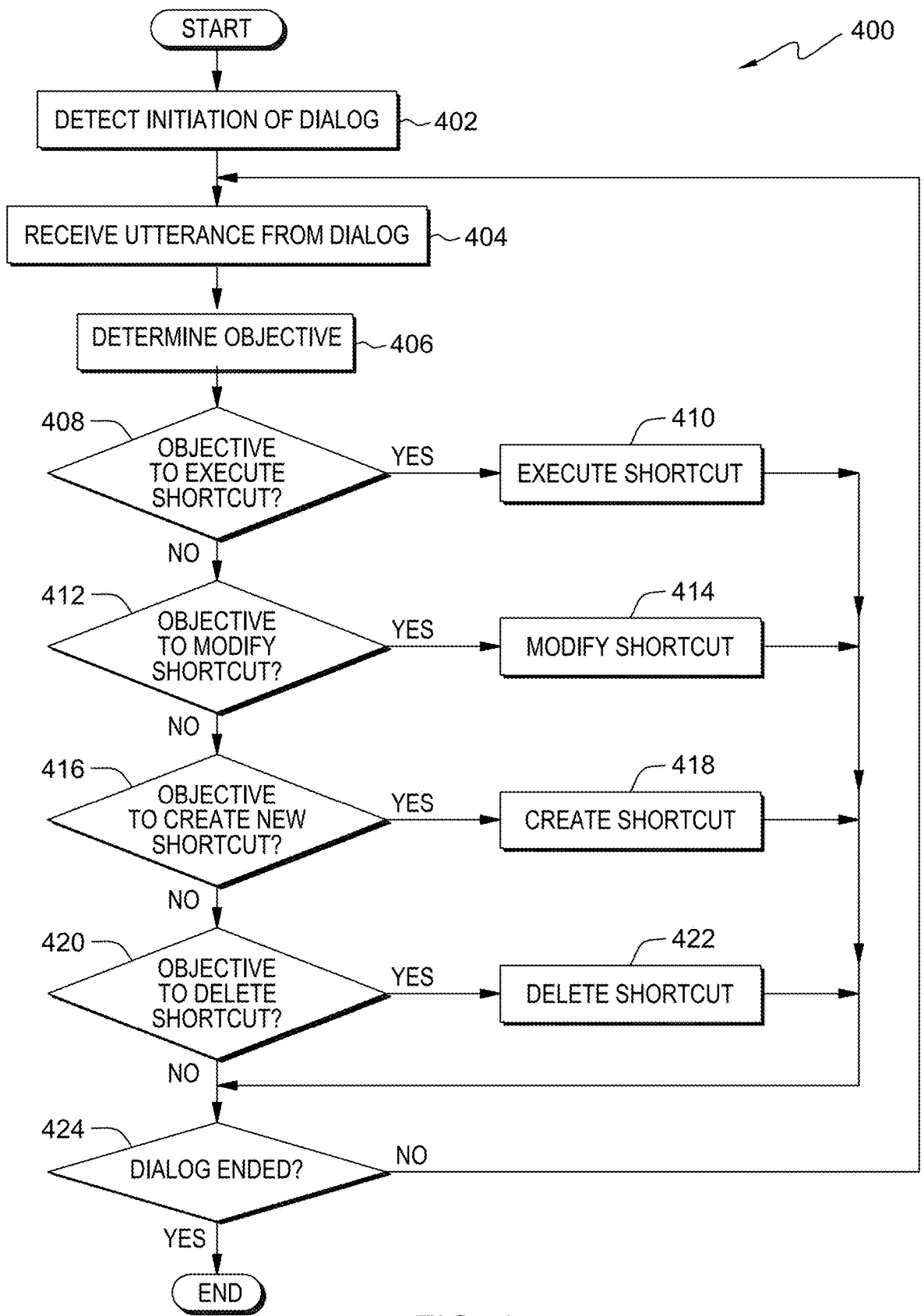
FIG. 4 is a flowchart for the steps for the dialog shortcut program, within the distributed data processing environment of FIG. 1, in accordance with an embodiment of the present invention.

FIG. 4 is a flowchart for the steps for the dialog shortcut program, within the distributed data processing environment of FIG. 1, in accordance with an embodiment of the present invention. In an embodiment, dialog shortcut program 112 resides between the runtime application, e.g., a chat application, and the existing dialog workspace. In an alternative embodiment, the steps of workflow 400 may be performed by any other program while working with dialog shortcut program 112.

In an embodiment, dialog shortcut program 112 intercepts the dialog between the runtime application and the existing dialog workspace to capture any utterances from the user that may indicate a possible use of a shortcut. In an embodiment, dialog shortcut program 112 analyzes the utterance to determine if the utterance contains an objective to use a shortcut. In an embodiment, if dialog shortcut program 112 determines that the objective is to execute or invoke a shortcut, then dialog shortcut program 112 receives a trigger name for the shortcut from the user. In an embodiment, dialog shortcut program 112 then executes the shortcut. In an embodiment, dialog shortcut program 112 then proceeds to decision block 424 to determine if the dialog completed. In an embodiment, if dialog shortcut program 112 determines that the objective is to modify a shortcut, then dialog shortcut program 112 may use dialog-based triggers to support the modify operation. In an embodiment, dialog shortcut program 112 then modifies the shortcut. In an embodiment, dialog shortcut program 112 then proceeds to decision block 424 to determine if the dialog completed. In an embodiment, if dialog shortcut program 112 determines that the objective is to create a new shortcut, then dialog shortcut program 112 will interact with the user to create a new shortcut. In an embodiment, dialog shortcut program 112 then proceeds to decision block 424 to determine if the dialog completed. In an embodiment, if dialog shortcut program 112 determines that the objective is to delete a shortcut, then dialog shortcut program 112 will authenticate the user, and once the user is authenticated, then dialog shortcut program 112 will delete the existing shortcut. In an embodiment, dialog shortcut program 112 determines whether the current dialog has ended. In an embodiment, if dialog shortcut program 112 determines that the current dialog has ended, then dialog shortcut program 112 ends for this cycle.

It should be appreciated that embodiments of the present invention provide at least for creation and execution of dialog shortcuts. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Dialog shortcut program 112 detects initiation of a dialog (step 402). In an embodiment, dialog shortcut program 112 resides between the runtime application, e.g., a chat application, and the existing dialog workspace. In an embodiment, since dialog shortcut program 112 resides between the runtime application and the existing dialog workspace, dialog shortcut program 112 detects that a new dialog has been initiated with a user by monitoring the runtime application output.

Dialog shortcut program 112 receives an utterance from the dialog (step 404). In an embodiment, dialog shortcut program 112 intercepts the dialog between the runtime application and the existing dialog workspace to capture any utterances from the user that may indicate a possible use of a shortcut.

Dialog shortcut program 112 determines the objective (step 406). In an embodiment, dialog shortcut program 112 analyzes the utterance to determine if the utterance contains an objective to use a shortcut. In an embodiment, dialog shortcut program 112 determines if the objective is to execute a shortcut, to define a new shortcut, to modify an existing shortcut, or to delete an existing shortcut. User data for shortcuts can be separated from the actual enterprise backend. Invocation of a shortcut causes a behind-the-scenes execution of a dialog with the back end dialog workspace thus requiring no modifications to existing back end dialog architectures.

In an embodiment, dialog shortcut program 112 uses the dialog framework itself to model the operations. In an embodiment, dialog shortcut program 112 models each operation as an intent followed by a response or series of responses, which together constitutes a flow. In an embodiment, dialog shortcut program 112 uses a classifier as an intent detector. In another embodiment, dialog shortcut program 112 uses a k-nearest neighbor search as an intent detector. In yet another embodiment, dialog shortcut program 112 may use any appropriate ML or NLP algorithm as an intent detector as would be known to one skilled in the art.

In an embodiment, if the utterance does not contain an objective to use a shortcut, then dialog shortcut program 112 may monitor the dialog, and when the dialog is complete, dialog shortcut program 112 analyzes the dialog to determine if the dialog potentially contains a candidate for a shortcut. In another embodiment, dialog shortcut program 112 may perform a historical analysis of usage/bot interaction logs for the user, at the enterprise level, or for some slice of users to determine whether a dialog is candidate for shortcut.

In an embodiment, if dialog shortcut program 112 determines that the dialog potentially contains a candidate for a shortcut, then dialog shortcut program 112 may ask if the user would like to create a dialog shortcut for the current interaction. In an embodiment, if dialog shortcut program 112 receives a positive response from the user, then dialog shortcut program 112 will trigger the create shortcut operation which will replay the dialog. In an embodiment, dialog shortcut program 112 may allow users to edit any entities or dynamic fields in the original dialog and assign a shortcut name. In another embodiment, dialog shortcut program 112 may request entities or dynamic fields which the user can provide, and dialog shortcut program 112 will add these to the shortcut.

Dialog shortcut program 112 determines if the objective is to execute a shortcut (decision block 408). In an embodiment, if dialog shortcut program 112 determines in step 406 that the objective is not to execute a shortcut ("no" branch, decision block 408), then dialog shortcut program 112 continues to decision block 412. In an embodiment, if dialog shortcut program 112 determines in step 406 that the objective is to execute a shortcut ("yes" branch, decision block 408), then dialog shortcut program 112 proceeds to step 410 to execute the shortcut.

Dialog shortcut program 112 executes the shortcut (step 410). In an embodiment, if dialog shortcut program 112 determines that the objective is to execute or invoke a shortcut ("yes" branch, decision block 408), then dialog shortcut program 112 authenticates the user. In an embodiment, dialog shortcut program 112 receives a trigger name for the shortcut from the user. In another embodiment, dialog shortcut program 112 offers a list of existing shortcuts for the user to select from. Dialog shortcut program 112 then receives the selection from the user.

In an embodiment, dialog shortcut program 112 determines if the shortcut contains any dynamic fields in the shortcut that must be resolved. In an embodiment, if dialog shortcut program 112 determines that the shortcut contains any dynamic fields, then dialog shortcut program 112 prompts the user for the values for these dynamic fields, and upon receiving the values from the user, dialog shortcut program 112 substitutes these values for the placeholder values in the dynamic fields in the shortcut.

In an embodiment, once dialog shortcut program 112 receives the selection of the shortcut to execute from the user, dialog shortcut program 112 creates a behind-the-scenes execution of a dialog with the back end dialog workspace thus requiring no modifications to existing back end dialog architectures. In an embodiment, the invocation results in the user utterances from the dialog record of that trigger played out with the back end dialog bot. In an embodiment, the user may be notified for confirmation at each turn and/or visually shown how the dialog proceeds based on the dialog record.

In an embodiment, the trigger may have a fail-safe mechanism that stops the shortcut in the event of changes to the agent responses that deviate from the dialog record. In another embodiment, a Graphical User Interface (GUI)-based input presents suggestions to a user instead of direct execution of a shortcut trigger. In some embodiments, dialog shortcut program 112 may support user inputs to update parameter values in the dialog record, such as inputting an account number or an amount. In these embodiments, if dialog shortcut program 112 detects placeholder dynamic fields in the shortcut, then dialog shortcut program 112 will request the actual parameters to use in the dialog from the user and will substitute these parameters in the dynamic fields during the proxy dialog. In an embodiment, dialog shortcut program 112 then proceeds to decision block 424 to determine if the dialog has ended.

Dialog shortcut program 112 determines if the objective is to modify a shortcut (decision block 412). In an embodiment, if dialog shortcut program 112 determines in step 406 that the objective is not to modify a shortcut ("no" branch, decision block 412), then dialog shortcut program 112 continues to decision block 416. In an embodiment, if dialog shortcut program 112 determines in step 406 that the objective is to modify a shortcut ("yes" branch, decision block 412), then dialog shortcut program 112 proceeds to step 414 to modify the shortcut.

Dialog shortcut program 112 modifies the shortcut (step 414). In an embodiment, if dialog shortcut program 112 determines that the objective is to modify a shortcut, then dialog shortcut program 112 may use dialog-based triggers to support the modify operation. In an embodiment, dialog shortcut program 112 initiates a dialog session with the user to discover the modifications the user wants to make to the shortcut. In another embodiment, dialog shortcut program 112 may offer the user a GUI based dashboard for administering the shortcuts, where users can modify dialog records, values, or delete shortcuts altogether.

In an embodiment, dialog shortcut program 112 then implements the modifications to the shortcut. In an embodiment, dialog shortcut program 112 then proceeds to decision block 424 to determine if the dialog has ended.

Dialog shortcut program 112 determines if the objective is to create a new shortcut (decision block 416). In an embodiment, if dialog shortcut program 112 determines in step 406 that the objective is not to create a new shortcut ("no" branch, decision block 416), then dialog shortcut program 112 continues to decision block 420. In an embodiment, if dialog shortcut program 112 determines in step 406 that the objective is to create a new shortcut ("yes" branch, decision block 416), then dialog shortcut program 112 proceeds to step 418 to create the new shortcut.

Dialog shortcut program 112 creates a shortcut (step 418). In an embodiment, if dialog shortcut program 112 determines that the objective is to create a new shortcut, then dialog shortcut program 112 will interact with the user to create a new shortcut. In an embodiment, dialog shortcut program 112 may trigger the shortcut layer to "record" the interaction of the user with the back end dialog bot, e.g., "Record shortcut <trigger-name>" to register/create a new shortcut. In an embodiment, dialog shortcut program 112 then records user interaction with back end dialog bot (for example, for account transfer between Acc #XYZ and Acc #ABC for Rs XXX).

In an embodiment, dialog shortcut program 112 determines if there are any dynamic fields in the shortcut, i.e., fields such as an account number that will be provided by the user at runtime. In an embodiment, if dialog shortcut program 112 determines that there are dynamic fields in the shortcut, then dialog shortcut program 112 stores the placeholders for the dynamic fields in the shortcut prior to storing the shortcut in the shortcut store for the user. In another embodiment, dialog shortcut program 112 may always present the user with a GUI-based or gesture-based option to invoke this action. In an embodiment, dialog shortcut program 112 then proceeds to decision block 424 to determine if the dialog has ended.

Dialog shortcut program 112 determines if the objective is to delete a shortcut (decision block 420). In an embodiment, if dialog shortcut program 112 determines in step 406 that the objective is not to delete a shortcut ("no" branch, decision block 420), then dialog shortcut program 112 continues to decision block 424. In an embodiment, if dialog shortcut program 112 determines in step 406 that the objective is to delete a shortcut ("yes" branch, decision block 420), then dialog shortcut program 112 proceeds to step 422 to delete the shortcut.

Dialog shortcut program 112 deletes the shortcut (step 422). In an embodiment, if dialog shortcut program 112 determines that the objective is to delete a shortcut, then dialog shortcut program 112 will authenticate the user, and once the user is authenticated, then dialog shortcut program 112 will delete the existing shortcut.

Dialog shortcut program 112 determines if the dialog ended (decision block 424). In an embodiment, dialog shortcut program 112 determines whether the current dialog has ended. In an embodiment, if dialog shortcut program 112 determines that the current dialog has not ended ("no" branch, decision block 424), then dialog shortcut program 112 returns to step 404 to receive the next utterance. In an embodiment, if dialog shortcut program 112 determines that the current dialog has ended ("yes" branch, decision block 424), then dialog shortcut program 112 ends for this cycle.

Figure 5:
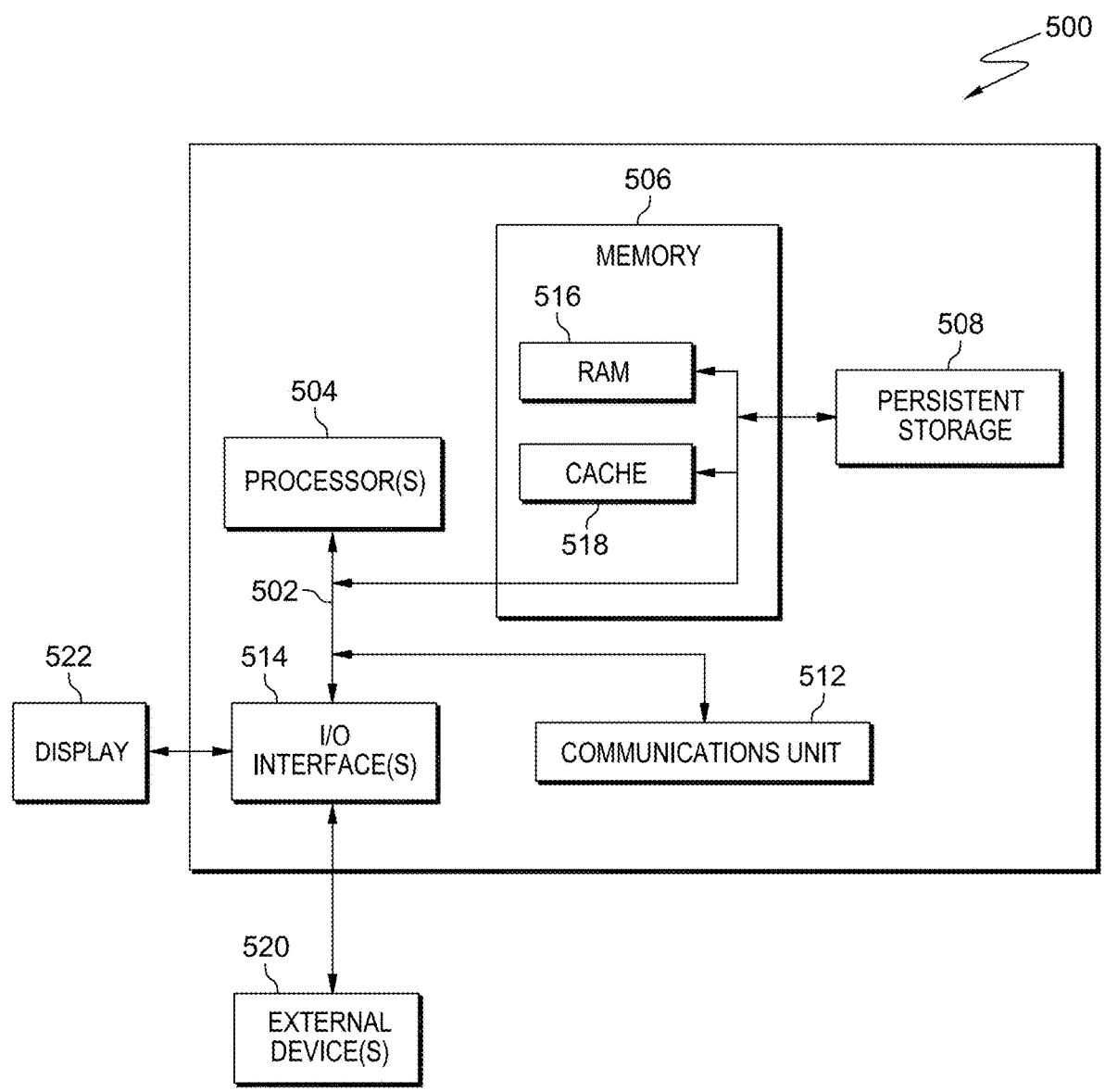
FIG. 5 depicts a block diagram of components of the computing devices executing the dialog shortcut program within the distributed data processing environment of FIG. 1, in accordance with an embodiment of the present invention.

FIG. 5 is a block diagram depicting components of computing device 110 suitable for dialog shortcut program 112, in accordance with at least one embodiment of the invention. FIG. 5 displays computer 500; one or more processor(s) 504 (including one or more computer processors); communications fabric 502; memory 506, including random-access memory (RAM) 516 and cache 518; persistent storage 508; communications unit 512; I/O interfaces 514; display 522; and external devices 520. It should be appreciated that FIG. 5 provides only an illustration of one embodiment and does not imply any limitations with regard to the environments in which different embodiments may be implemented. Many modifications to the depicted environment may be made.

As depicted, computer 500 operates over communications fabric 502, which provides communications between computer processor(s) 504, memory 506, persistent storage 508, communications unit 512, and I/O interface(s) 514. Communications fabric 502 may be implemented with any architecture suitable for passing data or control information between processors 504 (e.g., microprocessors, communications processors, and network processors), memory 506, external devices 520, and any other hardware components within a system. For example, communications fabric 502 may be implemented with one or more buses.

Memory 506 and persistent storage 508 are computer readable storage media. In the depicted embodiment, memory 506 comprises RAM 516 and cache 518. In general, memory 506 can include any suitable volatile or non-volatile computer readable storage media. Cache 518 is a fast memory that enhances the performance of processor(s) 504 by holding recently accessed data, and near recently accessed data, from RAM 516.

Program instructions for dialog shortcut program 112 may be stored in persistent storage 508, or more generally, any computer readable storage media, for execution by one or more of the respective computer processors 504 via one or more memories of memory 506. Persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links. In the context of some embodiments of the present invention, the source of the various input data may be physically remote to computer 500 such that the input data may be received, and the output similarly transmitted via communications unit 512.

I/O interface(s) 514 allows for input and output of data with other devices that may be connected to computer 500. For example, I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., dialog shortcut program 112, can be stored on such portable computer readable storage media and can be loaded onto persistent storage 508 via I/O interface(s) 514. I/O interface(s) 514 also connect to display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
  responsive to detecting initiation of a dialog, receiving, by one or more computer processors, an utterance from a user;
  determining, by one or more computer processors, that the utterance contains an objective of the user, with respect to a shortcut; and
  responsive to determining that the utterance contains the objective, implementing, by one or more computer processors, the objective, wherein implementing the objective comprises:
    analyzing, by one or more computer processors, the dialog to determine that the dialog contains one or more dynamic fields; and
    responsive to determining that the dialog contains the one or more fields, inserting, by one or more computer processors, the one or more dynamic fields into the shortcut prior to storing the dialog in a shortcut store for the user.

2. The computer-implemented method of claim 1 further comprising:
responsive to determining that a second utterance of a second dialog does not contain the objective, monitoring, by one or more computer processors, the second dialog;
responsive to determining that the second dialog has ended, analyzing, by one or more computer processors, the second dialog to determine the second dialog contains a possible shortcut;
responsive to determining that the second dialog contains the possible shortcut, notifying, by one or more computer processors, the user that the second dialog contains the possible shortcut; and
responsive to receiving a positive response from the user, creating, by one or more computer processors, a new shortcut based on an analysis of the second dialog.

3. The computer-implemented method of claim 1, wherein responsive to determining that the utterance contains the objective, implementing, by one or more computer processors, the objective further comprises:
responsive to determining that the objective is to create the shortcut, receiving, by one or more computer processors, a trigger name from the user;
recording, by the one or more computer processors, an interaction between the user and the dialog; and
responsive to determining that the dialog has ended, storing, by the one or more computer processors, the dialog in the shortcut store for the user under the trigger name.

4. The computer-implemented method of claim 1, wherein responsive to determining that the utterance contains the objective, implementing, by one or more computer processors, the objective further comprises:
responsive to determining that the objective is to execute the shortcut, authenticating, by one or more computer processors, the user;
receiving, by one or more computer processors, a selection of an existing shortcut from the user; and
creating, by one or more computer processors, a behind-the-scenes execution of a dialog with a back end dialog workspace to execute the shortcut as a proxy of the user.

5. The computer-implemented method of claim 4, further comprising:
requesting, by one or more computer processors, one or more parameters from the user; and
responsive to receiving the one or more parameters from the user, inserting, by one or more computer processors, the one or more parameters for one or more dynamic fields in the objective.

6. The computer-implemented method of claim 4, wherein the shortcut has a mechanism to stop the shortcut if an agent response deviates from a dialog record.

7. The computer-implemented method of claim 1, wherein responsive to determining that the utterance contains the objective, implementing, by one or more computer processors, the objective further comprises:
responsive to determining that the objective is to modify the shortcut, receiving, by one or more computer processors, a trigger name from the user;
retrieving, by one or more computer processors, the shortcut from the shortcut store for the user based on the trigger name;
receiving, by one or more computer processors, one or more modifications from the user;
inserting, by one or more computer processors, the one or more modifications into the shortcut; and
storing, by one or more computer processors, the shortcut into the shortcut store for the user based on the trigger name.

8. The computer-implemented method of claim 1, wherein responsive to determining that the utterance contains the objective, implementing, by one or more computer processors, the objective further comprises:
responsive to determining that the objective is to delete the shortcut, deleting, by one or more computer processors, the shortcut from the shortcut store for the user.

9. A computer program product comprising:
one or more computer readable storage media and program instructions collectively stored on the one or more computer readable storage media, the program instructions including instructions to:
responsive to detecting initiation of a dialog, receive an utterance from a user;
determine that the utterance contains an objective of the user, with respect to a shortcut; and
responsive to determining that the utterance contains the objective, implement the objective, wherein implementing the objective comprises:
analyzing, by one or more computer processors, the dialog to determine that the dialog contains one or more dynamic fields; and
responsive to determining that the dialog contains the one or more fields, inserting, by one or more computer processors, the one or more dynamic fields into the shortcut prior to storing the dialog in a shortcut store for the user.

10. The computer program product of claim 9, wherein responsive to determining that the utterance contains the objective, implementing the objective further comprises program instructions, stored on the one or more computer readable storage media, to:
responsive to determining that the objective is to create the shortcut, receive a trigger name from the user;
record an interaction between the user and the dialog; and
responsive to determining that the dialog has ended, store the dialog in the shortcut store for the user under the trigger name.

11. The computer program product of claim 9, wherein responsive to determining that the utterance contains the objective, implementing the objective further comprises program instructions, stored on the one or more computer readable storage media, to:
responsive to determining that the objective is to execute the shortcut, authenticate the user;
receive a selection of an existing shortcut from the user; and
create a behind-the-scenes execution of a dialog with a back end dialog workspace to execute the shortcut as a proxy of the user.

12. The computer program product of claim 11, further comprising program instructions, stored on the one or more computer readable storage media, to:
request one or more parameters from the user; and
responsive to receiving the one or more parameters from the user, insert the one or more parameters for one or more dynamic fields in the objective.

13. The computer program product of claim 9, wherein responsive to determining that the utterance contains the objective, implementing the objective further comprises program instructions, stored on the one or more computer readable storage media, to:

responsive to determining that the objective is to modify the shortcut, receive a trigger name from the user;
retrieve the shortcut from the shortcut store for the user based on the trigger name;
receive one or more modifications from the user;
insert the one or more modifications into the shortcut; and
store the shortcut into the shortcut store for the user based on the trigger name.

14. The computer program product of claim 9, wherein responsive to determining that the utterance contains the objective, execute the objective further comprises program instructions, stored on the one or more computer readable storage media, to:
responsive to determining that the objective is to delete the shortcut, deleting, by the one or more computer processors, the shortcut from the shortcut store for the user.

15. A computer system comprising:
one or more computer processors;
one or more computer readable storage media; and
program instructions stored on the one or more computer readable storage media for execution by at least one of the one or more computer processors, the stored program instructions including instructions to:
responsive to detecting initiation of a dialog, receive an utterance from a user;
determine that the utterance contains an objective of the user, with respect to a shortcut; and
responsive to determining that the utterance contains the objective, implement the objective, wherein implementing the objective comprises:
analyzing, by one or more computer processors, the dialog to determine that the dialog contains one or more dynamic fields; and
responsive to determining that the dialog contains the one or more fields, inserting, by one or more computer processors, the one or more dynamic fields into the shortcut prior to storing the dialog in a shortcut store for the user.

16. The computer system of claim 15, further comprising program instructions, stored on the one or more computer readable storage media for execution by at least one of the one or more computer processors, to:
responsive to determining that a second utterance of a second dialog does not contain the objective, monitor the second dialog;
responsive to determining that the second dialog has ended, analyze the second dialog to determine the dialog contains a possible shortcut;
responsive to determining that the second dialog contains the possible shortcut, notify the user that the second dialog contains the possible shortcut; and
responsive to receiving a positive response from the user, create a new shortcut based on an analysis of the second dialog.

17. The computer system of claim 15, wherein responsive to determining that the utterance contains the objective, implementing the objective further comprises program instructions, stored on the one or more computer readable storage media for execution by at least one of the one or more computer processors, to:
responsive to determining that the objective is to create the shortcut, receive a trigger name from the user;
record an interaction between the user and the dialog; and
responsive to determining that the dialog has ended, store the dialog in the shortcut store for the user under the trigger name.

* * * * *